(12) United States Patent
Sharma et al.

(10) Patent No.: US 11,558,928 B2
(45) Date of Patent: Jan. 17, 2023

(54) PROACTIVE CONTENT PLACEMENT FOR LOW LATENCY MOBILE ACCESS

(71) Applicant: AT&T Intellectual Property I, L.P., Atlanta, GA (US)

(72) Inventors: Deva-Datta Sharma, San Ramon, CA (US); John Oetting, Zionsville, PA (US); Vishwa M. Prasad, Matawan, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 242 days.

(21) Appl. No.: 16/876,648

(22) Filed: May 18, 2020

(65) Prior Publication Data

US 2021/0360740 A1 Nov. 18, 2021

(51) Int. Cl.
*H04W 84/18* (2009.01)
*G06T 19/00* (2011.01)
*H04W 36/32* (2009.01)
*G06F 21/10* (2013.01)
*H04W 64/00* (2009.01)
*G06F 3/01* (2006.01)
*G06V 20/20* (2022.01)

(52) U.S. Cl.
CPC .............. *H04W 84/18* (2013.01); *G06F 3/011* (2013.01); *G06F 21/10* (2013.01); *G06T 19/006* (2013.01); *G06V 20/20* (2022.01); *H04W 36/32* (2013.01); *H04W 64/003* (2013.01)

(58) Field of Classification Search
CPC ... H04W 84/18; H04W 36/32; H04W 64/003; H04W 4/02; G06F 3/011; G06F 21/10; G06T 19/006; G06V 20/20
See application file for complete search history.

(56) References Cited

U.S. PATENT DOCUMENTS

| | | | |
|---|---|---|---|
| 2019/0278631 A1* | 9/2019 | Guim Bernat | G06F 9/542 |
| 2020/0163042 A1* | 5/2020 | Cho | H04W 48/18 |
| 2020/0204603 A1* | 6/2020 | Upadhyaya | H04L 65/4076 |
| 2020/0259878 A1* | 8/2020 | Yang | H04L 65/605 |

FOREIGN PATENT DOCUMENTS

CN 109362064 A * 2/2019

* cited by examiner

*Primary Examiner* — Charles N Appiah
*Assistant Examiner* — Frank E Donado
(74) *Attorney, Agent, or Firm* — Amin, Turocy & Watson, LLP

(57) ABSTRACT

The described technology is generally directed towards proactive content placement for low latency mobile access. Digital content requested by a mobile device can be sent to network nodes proactively, so that the network nodes have the digital content before it is requested by the mobile device. Mobile device travel predictions can be made to predict future locations of the mobile device. The future locations can be used to determine network nodes for proactive digital content delivery. The digital content for delivery to a network node can also be predicted based on current digital content in use at the mobile device and estimated arrival times of the mobile device into service areas of next network nodes.

20 Claims, 9 Drawing Sheets

PROACTIVE CONTENT PLACEMENT FOR LOW LATENCY MOBILE ACCESS

TECHNICAL FIELD

The subject application is related to fifth generation (5G) and subsequent generation cellular communication systems.

BACKGROUND 5G wireless technologies will improve the performance and throughput of wireless networks. These wireless network enhancements will enable a new generation of mobile services characterized by low latencies, very high bandwidth, spectrum efficiency, operations automation, and the like.

Enhancements associated with 5G radio access network (RAN) technologies create challenges and opportunities for other systems involved in delivery of end-to-end service. If other systems do not also step up their performance, then the benefits of 5G RAN technologies will hampered.

For example, augmented reality (AR) and virtual reality (VR) technologies are expected to benefit from the low latency and high throughput associated with 5G technologies. AR and VR have promising applications in a variety of areas such as games, advertising, training, education, fieldwork, etc. Some of these applications will require delivery of digital content to mobile user equipment (UE) devices. In such use cases, an entire end-to-end service may have demands to deliver digital content to a mobile UE at or near the speeds achievable via the 5G RAN.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
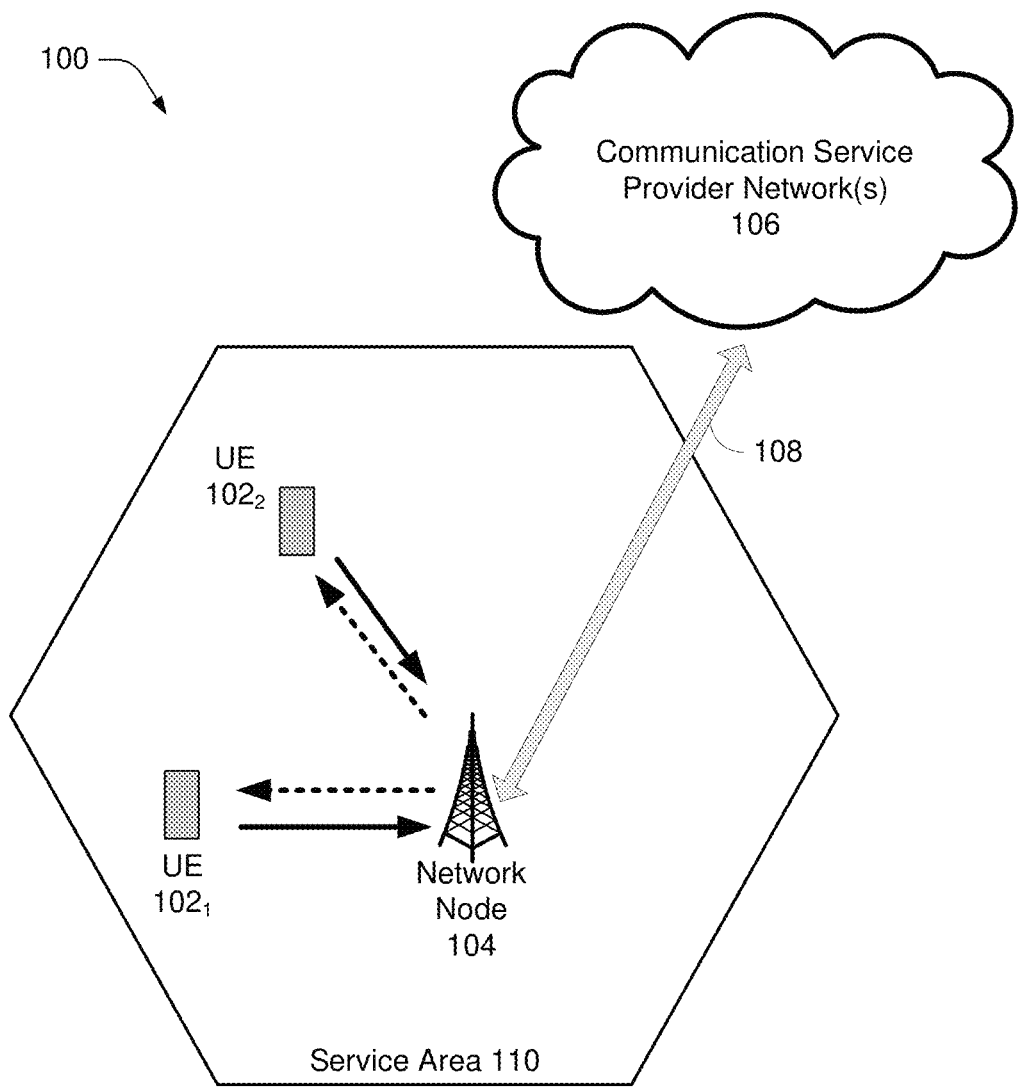
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards proactive content placement for low latency mobile access. Digital content requested by a mobile device can be sent to network nodes proactively, so that the network nodes have the digital content before it is requested by the mobile device. Mobile device travel predictions can be made to predict future locations of the mobile device. The future locations can be used to determine network nodes for proactive digital content delivery. The digital content for delivery to a network node can also be predicted, e.g., based on current digital content in use at the mobile device and an estimated arrival time of the mobile device into a service area of a next network node.

Examples of digital content include media such as images, videos, audio content, and three dimensional (3D) objects. Digital content can also include experiences such as AR interactions and overlays, and gaming and work instructions. Maps, including two dimensional (2D) maps, 3D maps, and point clouds are also digital content. This disclosure is not limited to any particular form of digital content.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, an application running on a server, the application or other media residing on the server, and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities, computational components, or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve one or several cells, also called sectors or service areas, depending on the configuration and type of antenna. In example embodiments, when UEs 102 are within service area 110, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
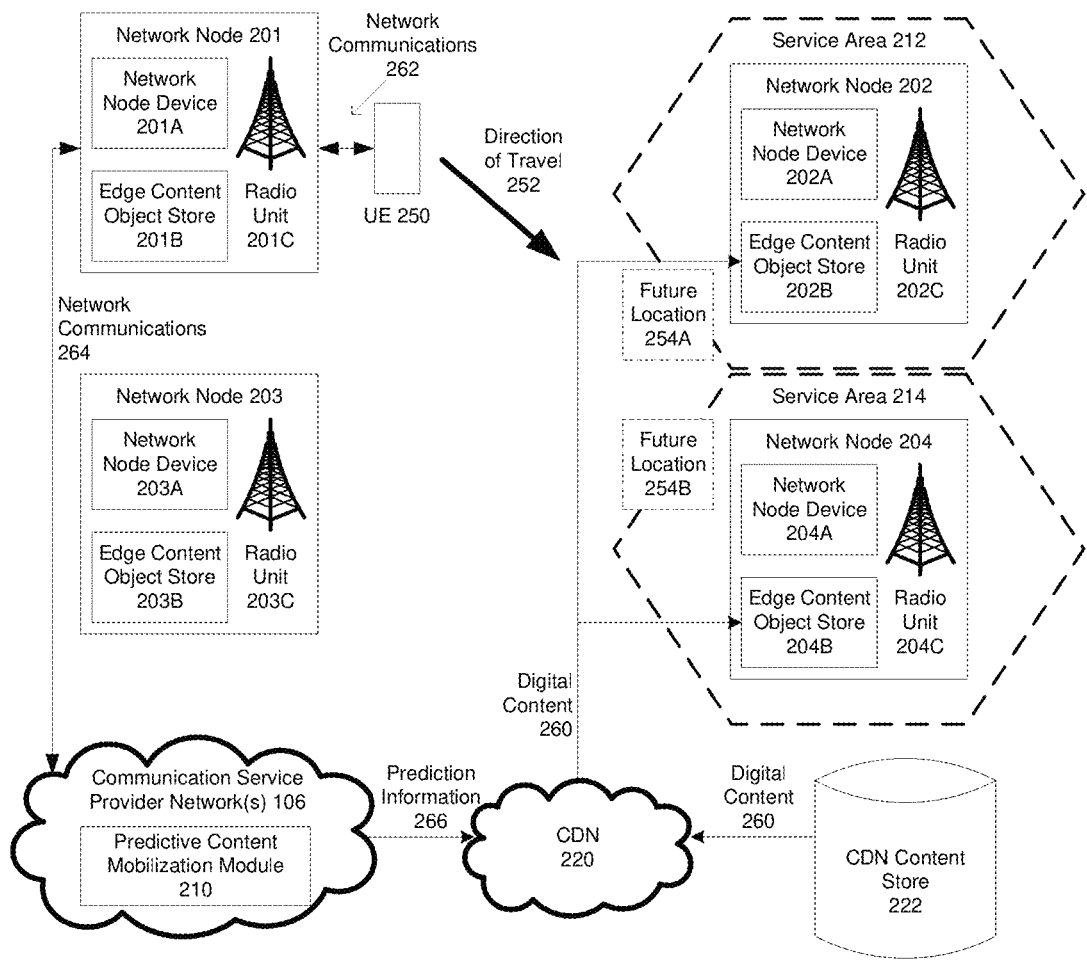
FIG. 2 illustrates an example a wireless communication system arranged for proactive content placement for low latency mobile access, in accordance with various aspects and embodiments of the subject disclosure.

FIG. 2 illustrates an example a wireless communication system arranged for proactive content placement for low latency mobile access, in accordance with various aspects and embodiments of the subject disclosure. FIG. 2 includes multiple example network nodes 201, 202, 203, and 204, a UE 250, communication service provider network(s) 106, a content delivery network (CDN) 220, and a CDN content store 222. The communication service provider network(s) 106 are introduced in FIG. 1, however, in FIG. 2, the communication service provider network(s) 106 further comprise a predictive content mobilization module 210. The example network nodes 201, 202, 203, and 204 can comprise instances of network node 104 introduced in FIG. 1, and the UE 250 can comprise an instance of UEs 102 introduced in FIG. 1.

Each of the network nodes 201, 202, 203, and 204 can include, inter alia, a network node device, an edge content object store, and a radio unit. Thus network node 201 comprises network node device 201A, edge content object store 201B, and radio unit 201C. Network node 202 comprises network node device 202A, edge content object store 202B, and radio unit 202C. Network node 203 comprises network node device 203A, edge content object store 203B, and radio unit 203C. Network node 204 comprises network node device 204A, edge content object store 204B, and radio unit 204C.

In an alternative arrangement, the edge content object stores 201B, 202B, 203B, and 204B can be physically near the network nodes 201, 202, 203, and 204, e.g., rather than incorporated within the network nodes 201, 202, 203, and 204. The term "proximally coupled" is used herein to refer to incorporating the edge content object stores 201B, 202B, 203B, and 204B within the network nodes 201, 202, 203, and 204, or otherwise coupling the edge content object stores 201B, 202B, 203B, and 204B within a defined proximal distance of the network nodes 201, 202, 203, and 204. The defined proximal distance can be, e.g., 1 kilometer, 500 meters, 250 meters, or 100 meters, depending properties of desired embodiments. The defined proximal distance can also be defined, e.g., as any distance equal to or less than a distance to a nearest neighbor network node, or any distance equal to or less than a fraction (such as one half) of the distance to the nearest neighbor node. For some implementations, the defined proximal distance can be defined as an average, mean, or median distance between network nodes in a geographical area, or a fraction (such as one half) of the average, mean, or median distance between network nodes in a geographical area.

In general, with regard to FIG. 2, the network nodes 201, 202, 203, and 204 can be spread over a geographic area, such as a city or a rural area. Each of the network nodes 201, 202, 203, and 204 can support wireless communications of UEs, such as UE 250, when the UE 250 is within its service area. Example service area 212 is supported by network node 202, and example service area 214 is supported by network node 204. The network nodes 201, 202, 203, and 204 can each be coupled with the communication service provider network(s) 106, also referred to herein as a core network, via one or more backhaul links 108 such as illustrated in FIG. 1.

The UE 250 can travel among the various service areas supported by network nodes 201, 202, 203, and 204. For example, the UE 250 is illustrated proximal to network node 201, and within the service area of network node 201, while UE 250 has a direction of travel 252 in the direction of network nodes 202 and 204. Future location 254A and future location 254B indicate predicted future locations of UE 250. Future location 254A is within service area 212, and future location 254B is within service area 214.

The CDN 220 can be configured to serve digital content to the UE 250. For example, when the UE 250 is replaying a movie, the CDN 220 can retrieve movie segments from the CDN content store 222, and the CDN 220 can send the movie segments to the UE 250. In some embodiments, the CDN 220 can send digital content to the UE 250 via the communication service provider network(s) 106. The communication service provider network(s) 106 can receive digital content from the CDN 220 and the communication service provider network(s) 106 can send received digital content to UE 250 via the network nodes 201, 202, 203, and 204. In other embodiments, the CDN 220 can be arranged to communicate directly with devices at the network nodes 201, 202, 203, and 204. For example, the CDN 220 can send movie segments directly edge computing devices that host the edge content object stores 201B, 202B, 203B, and 204B.

The CDN 220 can likewise be configured to serve other forms of digital content, such as AR or VR content, to the UE 250. For example, when the UE 250 provides an AR display for electric utility inspection and troubleshooting, the CDN 220 can retrieve digital content such as status, performance and technical information of various electric utility components such as transformers, taps, fuses, drops, insulators, grounds, guy wires etc. from the CDN content store 222, and the CDN 220 can send such digital content to the UE 250, as described above.

The communication service provider network(s) 106 can be configured to support network communications of the UE 250. When the UE 250 is connected to network node 201 as illustrated in FIG. 2, the communication service provider network(s) 106 can engage in network communications 264 between communication service provider network(s) 106 and network node 201. The network node 201 can in turn engage in network communications 262 between network node 201 and UE 250.

Network communications 264 and 262 can comprise, inter alia, information that can be used to estimate UE 250 location and direction of travel 252. A variety of UE location and movement detection technologies are currently in use in today's wireless communication networks, and this disclosure is not limited to any particular approach. Network communications 264 and 262 can furthermore comprise initial digital content from CDN 220. In some embodiments, CDN 220 can support an ongoing digital content experience at UE 250, for example by sending initial digital content to edge content object store 201B for transmission to the UE 250 when requested. Network communications 264 and 262 can furthermore comprise digital content state information, for example, an identification of a movie segment that is currently being replayed at UE 250.

The predictive content mobilization module 210 can be configured to use information included in network communications 264 to predict future locations of the UE 250. For example, the predictive content mobilization module 210 can predict the future location 254A and the future location 254B as likely future locations of UE 250. Various example techniques to predict future locations 254A, 254B are disclosed herein. The predictive content mobilization module 210 can use the predicted future locations 254A, 254B to identify network nodes 202, 204 corresponding to the predicted future locations 254A and 254B. In some embodiments, the predictive content mobilization module 210 can furthermore estimate arrival times for UE 250 arrival at the predicted future locations 254A, 254B, and probabilities that the UE 250 will arrive at the predicted future locations 254A, 254B.

In an example embodiment, the predictive content mobilization module 210 can be configured to send prediction information 266 to the CDN 220. The prediction information 266 can comprise, e.g., current digital content state information retrieved from UE 250, as well as identifications of network nodes 202, 204 corresponding to the predicted future locations 254A, 254B of UE 250, and estimated arrival times of UE 250 arrival at the predicted future locations 254A, 254B.

In such an example embodiment, the CDN 220 can be configured to retrieve digital content 260 from the CDN content store 222, wherein digital content 260 comprises digital content that is predicted to be consumed at UE 250 when UE 250 arrives at either of future locations 254A or 254B. For example, if the UE 250 is predicted to arrive at future location 254A in 5 minutes, the CDN 220 can retrieve from CDN content store 222 movie segments that are about 5 minutes ahead of a currently replayed segment identified in digital content state information. If the UE 250 is predicted to arrive at future location 254B in 10 minutes, the CDN 220 can retrieve from CDN content store 222 movie segments that are about 10 minutes ahead of a currently replayed segment identified in digital content state information. The CDN 220 can then send the digital content 260 to edge content object stores 202B, 202C of network nodes 202, 204 identified in the prediction information 266.

In some scenarios, prediction information 266 can identify different estimated arrival times for different predicted future locations 254A and 254B. The CDN 220 can be configured to send different digital content 260 to different network nodes 202, 204 having different estimated arrival times.

While the example of digital content 260 comprising movie segments is useful for its simplicity, other types of digital content is also contemplated for deployment in connection with embodiments of this disclosure. In particular, AR and VR digital content can have high bandwidth and low latency demands, and so AR and VR digital content is usefully deployed according to the techniques described herein. Digital content state information associated with AR and VR content can comprise, e.g., types of AR and VR objects associated with a current user session, states of AR or VR objects within a session, or AR and VR objects associated with a particular game or experience. AR and VR content can also comprise digital content that is localized to a particular geographic area, for example, a service area such as 212 or 214. Therefore, the AR and VR content sent from CDN 220 to different network nodes 202, 204 can comprise different sets of localized AR and VR objects.

Figure 3:
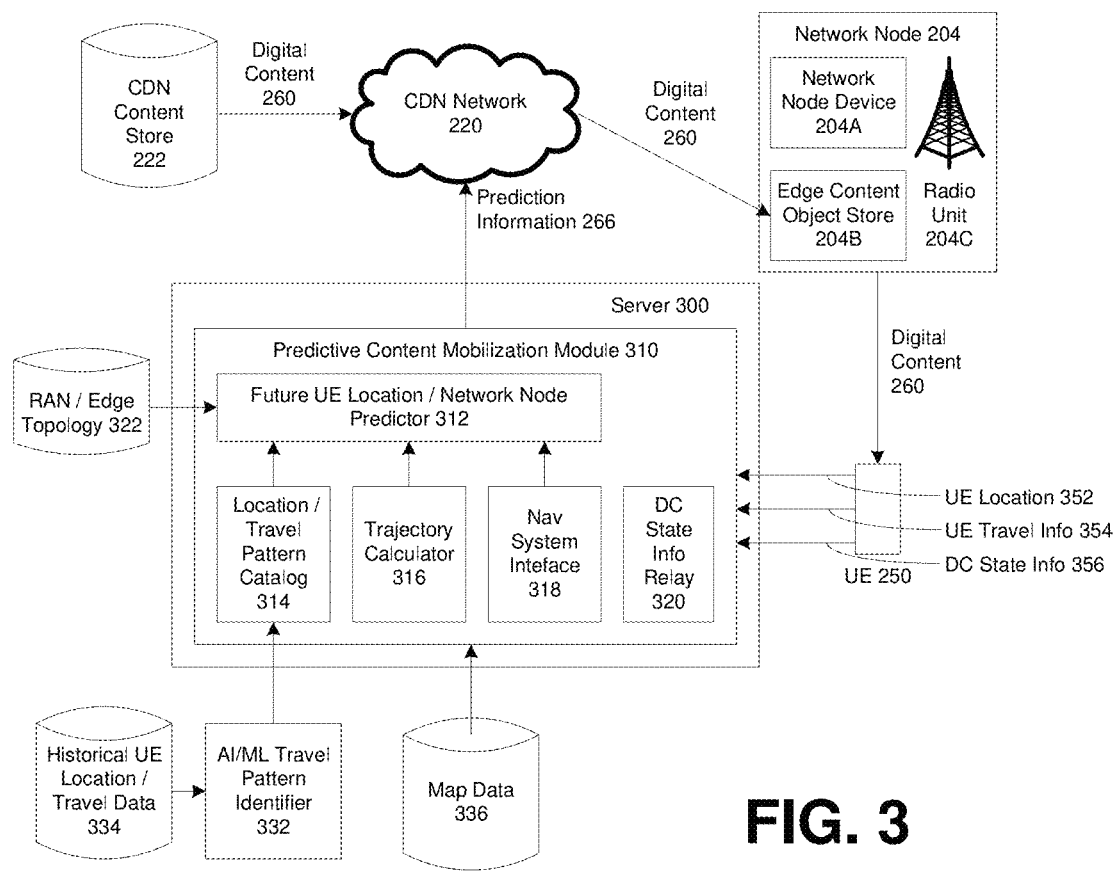
FIG. 3 illustrates an example predictive content mobilization module, in accordance with various aspects and embodiments of the subject disclosure.

As described further in connection with FIG. 3, example approaches to predict future locations 254A, 254B comprise estimations based on map information, speed and direction of travel, estimations based on travel pattern probabilities, and estimations based on navigation data entered at UE 250, e.g., a destination entered in a map application at the UE 250.

While FIG. 2 illustrates an embodiment wherein communication service provider network(s) 106 send prediction information 266 to CDN 220, and the CDN 220 subsequently delivers digital content 260 to network nodes 202, 204 associated with future locations 254A and 254B, other arrangements are feasible and within the scope of this disclosure. For example, in another arrangement, digital content 260 can be provided to communication service provider network(s) 106, and the communication service provider network(s) 106 can determine subsets of digital content 260 to send to different network nodes 202, 204 associated with predicted future locations 254A, 254B. The subsets of digital content 260 can be based on estimated arrival times as described herein.

In some embodiments, the predictive content mobilization module 210 can require a threshold probability that UE 250 will enter a service area, such as service area 212 or 214, prior to identifying the service area 212 or 214 in prediction information 266. Network bandwidth is not unlimited and therefore it is preferably used to supply digital content 260 to network nodes 202, 204 associated with high probabilities, e.g., fifty percent or higher, of eventually serving the digital content 260 to the UE 250. Similarly, prediction information 266 can be limited by estimated arrival times. Network nodes having short estimated arrival times, e.g., within 10 minutes or less, are associated with higher probabilities that any proactively placed digital content 260 will be consumed by UE 250. Longer arrival times are associated with lower consumption probabilities and therefore delivery of digital content 260 to network nodes associated with longer estimated arrival times can be delayed to preserve network bandwidth.

FIG. 3 illustrates an example predictive content mobilization module, in accordance with various aspects and embodiments of the subject disclosure. The example predictive content mobilization module 310 provides an example instance of the predictive content mobilization module 210 illustrated in FIG. 2. The example predictive content mobilization module 310 is implemented at a server 300 which can be included in communication service provider network(s) 106. The example predictive content mobilization module 310 comprises a future UE location/network node predictor 312, a location/travel pattern catalog 314, a trajectory calculator 316, a navigation system interface 318, and a digital content (DC) state information relay 320. The predictive content mobilization module 310 can furthermore comprise or operate in conjunction with RAN/edge topology 322, AI/ML travel pattern identifier 332 and historical UE location/travel data 334, and map data 336. Various other elements introduced in FIG. 2 are also included in FIG. 3, namely CDN content store 222, CDN network 220, network node 204 comprising network node device 204A, edge content object store 204B, and radio unit 204C, and UE 250.

The predictive content mobilization module 310 can be configured to receive information from UE 250, comprising for example UE location 352, UE travel info 354, and digital content (DC) state information 356. In an embodiment, the illustrated information received from UE 250 can be included in, or calculated based on, network communications 264 illustrated in FIG. 2.

The predictive content mobilization module 310 can be configured to use the information received from UE 250 to predict future UE 250 locations and corresponding network nodes. In the illustrated configuration, a future UE location/network node predictor 312 can use any of several supporting modules to make predictions. The example supporting modules comprise a location/travel prediction catalog 314, a trajectory calculator 316, and a navigation system interface 318.

In an embodiment, the navigation system interface 318 can receive navigation information included in the UE travel information 354 received from the UE 250. For example, a map application at the UE 250 can have UE 250 destination information as well as route information. The UE 250 destination and route information can be provided to navigation system interface 318, and this information can be provided to the future UE location/network node predictor 312. The future UE location/network node predictor 312 can use the UE 250 destination and route information to make a direct and high probability prediction of future UE 250 locations.

The trajectory calculator 316 can be configured to calculate a trajectory of UE 250 based on a current UE location 352, a direction and speed of UE movement (determined from UE travel info 354 or using previous UE locations), and map data 336. The trajectory can also be influenced by other factors such as traffic, time of day, and previous or routine trajectories of the UE 250. The trajectory of the UE 250 can be provided to the future UE location/network node predictor 312 to enable the future UE location/network node predictor 312 to predict future UE 250 locations.

The location/travel pattern catalog 314 can comprise a catalog of locations and corresponding probable future UE travel patterns. In an embodiment, the location/travel pattern catalog 314 can be generated and updated by the artificial intelligence (AI)/machine learning (ML) travel pattern identifier 332, using historical UE location/travel data 334. The historical UE location/travel data 334 can comprise historical UE location and movement data for multiple UEs. The AI/ML travel pattern identifier 332 can analyze the historical UE location/travel data 334 to build the location/travel pattern catalog 314, comprising a catalog of probable future UE movements, indexed by UE location information. The future UE location/network node predictor 312 can look up UE location 352 in the location/travel pattern catalog 314 to predict future UE 250 locations.

The future location prediction techniques disclosed herein are intended as a non-exhaustive set of example techniques, and this disclosure is not limited to any particular future location prediction technique or set of techniques. The disclosed future location prediction techniques can be modified, combined, and/or supplemented with other future location prediction techniques.

When the future UE location/network node predictor 312 has predicted future locations of UE 250, the future UE location/network node predictor 312 can look up network nodes corresponding to the predicted future locations of UE 250 in the RAN/edge topology 322. The RAN/edge topology 322 can provide RAN network nodes and/or corresponding edge computing devices associated with their respective geographical service areas. The future UE location/network node predictor 312 can identify service areas that overlap with predicted future locations of UE 250, and the future UE location/network node predictor 312 can identify network nodes that serve the identified service areas.

In an embodiment, the digital content (DC) state info relay 320 can be configured to receive any DC state information 356 from the UE 250, and include the received DC state information 356 in prediction information 266. The future UE location/network node predictor 312 can furthermore comprise identified future network nodes in prediction information 266. In some embodiments, the future UE location/network node predictor 312 can also comprise, in prediction information 266, arrival probabilities and estimated arrival time information associated with identified future network nodes.

As described in connection with FIG. 2, the CDN network 220 can be configured to use the prediction information 266 to identify future digital content 260 to proactively place at future network nodes, such as network node 204. The CDN network 220 can retrieve the digital content 260 from CDN content store 222 and send it to the network nodes identified in the prediction information 266, e.g., to network node 204. In an embodiment, the CDN network 220 can employ edge content object stores at network nodes or proximally coupled with network nodes, however, in other embodiments the CDN network 220 can send digital content 260 to any appropriately configured device at a network node 204.

Figure 4:
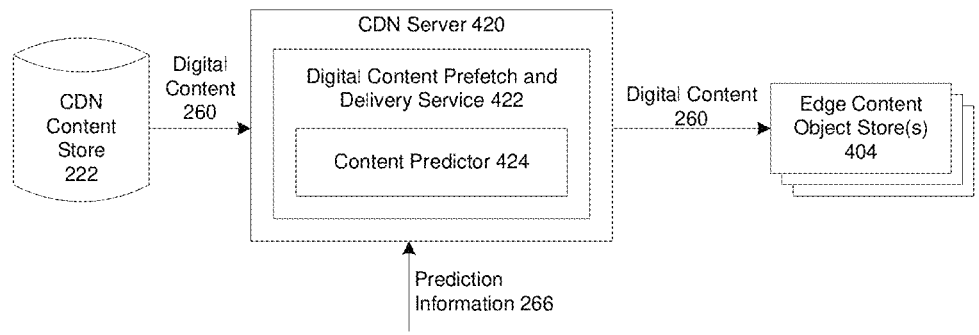
FIG. 4 illustrates an example content delivery network (CDN) server, in accordance with various aspects and embodiments of the subject disclosure.

FIG. 4 illustrates an example content delivery network (CDN) server, in accordance with various aspects and embodiments of the subject disclosure. The example CDN server 420 can comprise an instance of a server in a CDN network 220 such as illustrated in FIGS. 2 and 3. The CDN server 420 comprises a digital content prefetch and delivery service 422. The digital content prefetch and delivery service 422 comprises a content predictor 424. FIG. 4 furthermore illustrates the CDN content store 222, introduced in FIG. 2, and edge content object store(s) 404, which can comprise instances of edge content object stores 201B, 202B, 203B, and 204B, illustrated in FIG. 2.

In FIG. 4, the CDN server 420 can be configured to receive prediction information 266. In response to prediction information 266, the CDN server 420 can identify digital content 260 to send to edge content object store(s) 404, retrieve the digital content 260 from the CDN content store 222, and send the digital content 260 to the edge content object store(s) 404.

The content predictor 424 can be configured to use DC state information 356 included in the prediction information 266, along with estimated arrival times at edge content object store(s) 404 and any other information, such as locations of edge content object store(s) 404, to identify digital content 260 to be sent to the edge content object store(s) 404. Different digital content can optionally be identified for different edge content object store(s) 404.

The digital content prefetch and delivery service 422 can be configured to fetch digital content 260 identified by the content predictor 424 from the CDN content store 222. The digital content prefetch and delivery service 422 can send the digital content 260 to each of the edge content object store(s) 404 identified in the prediction information 266.

The CDN server 420 can also be configured to provide ongoing delivery of digital content to any of the edge content object store(s) 404. For example, should UE 250 remain within a service area of a single network node for an extended period of time while UE 250 continues to consume additional digital content, beyond digital content 260, the CDN server 420 can retrieve and deliver the additional digital content to an edge content object store associated with the network node serving the UE 250.

Figure 5:
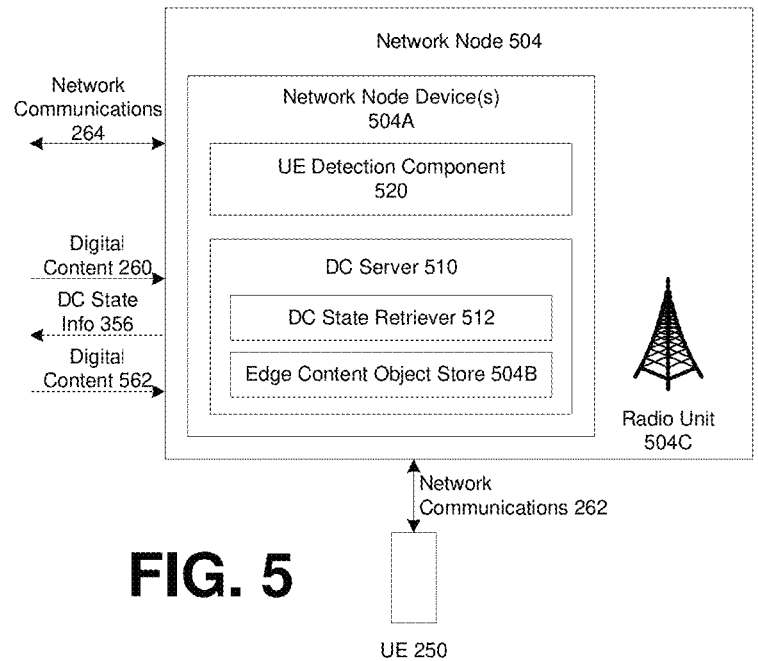
FIG. 5 illustrates an example network node, in accordance with various aspects and embodiments of the subject disclosure.

FIG. 5 illustrates an example network node, in accordance with various aspects and embodiments of the subject disclosure. The example network node 504 can implement any of the network nodes 201, 202, 203, and 204 illustrated in FIG. 2. The example network node 504 comprises network node device(s) 504A and radio unit 504C. The network node device(s) 504A comprise a UE detection component 520 and a digital content (DC) server 510. The DC server 510 comprises a DC state retriever 512 and an edge content object store 504B. The network node device(s) 504A illustrated in FIG. 5 can implement, e.g., any of network node devices 201A, 202A, 203A, and 204A, illustrated in FIG. 2, and the edge content object store 504B can implement any of the edge content object stores 201B, 202B, 203B, and 204B, illustrated in FIG. 2. FIG. 5 furthermore illustrates UE 250, also introduced in FIG. 2.

The network node device(s) 504A can be configured to receive digital content 260 prior to establishing communications with UE 250. The received digital content 260 can comprise an identifier of an associated UE 250. The DC server 510 can store received digital content 260 and the UE identifier in the edge content object store 504B. Meanwhile, the UE detection component 520 can detect new connections from UEs, and provide new UE identifiers to DC server 510. If a new UE identifier (e.g., associated with UE 250) matches digital content (e.g. digital content 260) stored in the edge content object store 504B, then the DC state retriever 512 can optionally retrieve current DC state information from UE 250, via network communications 262, and the DC server 260 can begin sending appropriate portions of digital content 260 to UE 250, also via network communications 262.

Should UE 250 request additional digital content, beyond the digital content 260, then additional digital content 562 can be delivered to UE 250 via network node 504. Furthermore, DC state retriever 512 can send occasional DC state information requests to UE 250. DC state information 356 reported by UE 250 can be sent to the CDN network 220 and/or the predictive content mobilization module 310, illustrated in FIG. 3.

In some embodiments, the edge content object store 504B can be configured to delete or otherwise expunge received digital content 260 from the edge content object store 504B. For example, digital content 260 that has been sent to UE 250 can be deleted from the edge content object store 504B. Also, the digital content 260 can expire and the edge content object store 504B can be configured to delete expired digital content. The digital content 260 can expire, for example, within a determined time interval after an estimated arrival time of UE 250 within the service area of network node 504.

Further example operations of network node 504 can comprise, e.g., processing network communications 262 between the network node 504 and the UE 250, and processing network communications 264 between the network node 504 and the core network. Network communications 264 and 262 can comprise, e.g., UE location information, voice calls, text messages and other data transmitted on behalf of UE 250. In some embodiments, network communications 264 can comprise digital content 260, DC state information 356, and digital content 562. In other embodiments, the digital content 260, DC state information 356, and/or digital content 562 can be included in communications with a CDN network 220, separate from network communications 264.

Figure 6:
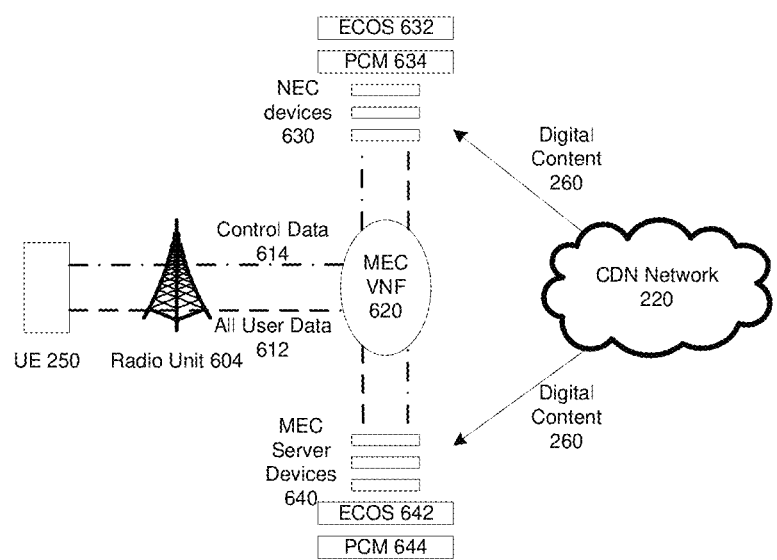
FIG. 6 illustrates several example multi-access edge computing options, in accordance with various aspects and embodiments of the subject disclosure.

FIG. 6 illustrates several example multi-access edge computing options, in accordance with various aspects and embodiments of the subject disclosure. FIG. 6 comprises UE 250, a radio unit 604, and a multi-access edge computing (MEC) virtual network function (VNF) 620.

A first example configuration can be used with network nodes distributed over a wide geographic area such as a city. In such a scenario, the MEC VNF 620 can connect with network edge compute (NEC) devices 630, and the NEC devices 630 can comprise aspects of this disclosure, e.g., an edge content object store (ECOS) 632 and/or a predictive content mobilization module (PCM) 634. All user data 612 and control data 614 can be routed to NEC devices 630. A second example configuration can be used with network nodes in a particular location, such as within a building. In such a scenario, the MEC VNF 620 can connect with MEC server devices 640, and the MEC server devices 640 can comprise aspects of this disclosure, e.g., an ECOS 642 and/or a PCM 644. All user data 612 and control data 614 can be routed to MEC server devices 640. In either of the above configurations, a CDN network 220 can connect with applicable edge devices and CDN network 220 can deliver digital content 260 to the edge devices.

While the discussion of FIG. 2-FIG. 6 has used a single UE 250 as an example, it should be emphasized that embodiments can involve multiple UEs. Furthermore, in scenarios involving multiple UEs, embodiments can proactively place digital content for future use by multiple UEs. For example, when many UEs are predicted to request digital content from a predicted future location, such as a sports stadium scheduled to host a sporting event, the technologies disclosed herein can be used to predict the future location of multiple UEs, as well as to predict digital content likely to be requested by the multiple UEs while at the predicted future location. The content can be predicted based on the nature of the event and location rather than current digital content being displayed at a particular UE. Predicted digital content can be proactively placed at predicted future network nodes in advance of UE arrival at the predicted future location.

Figure 7:
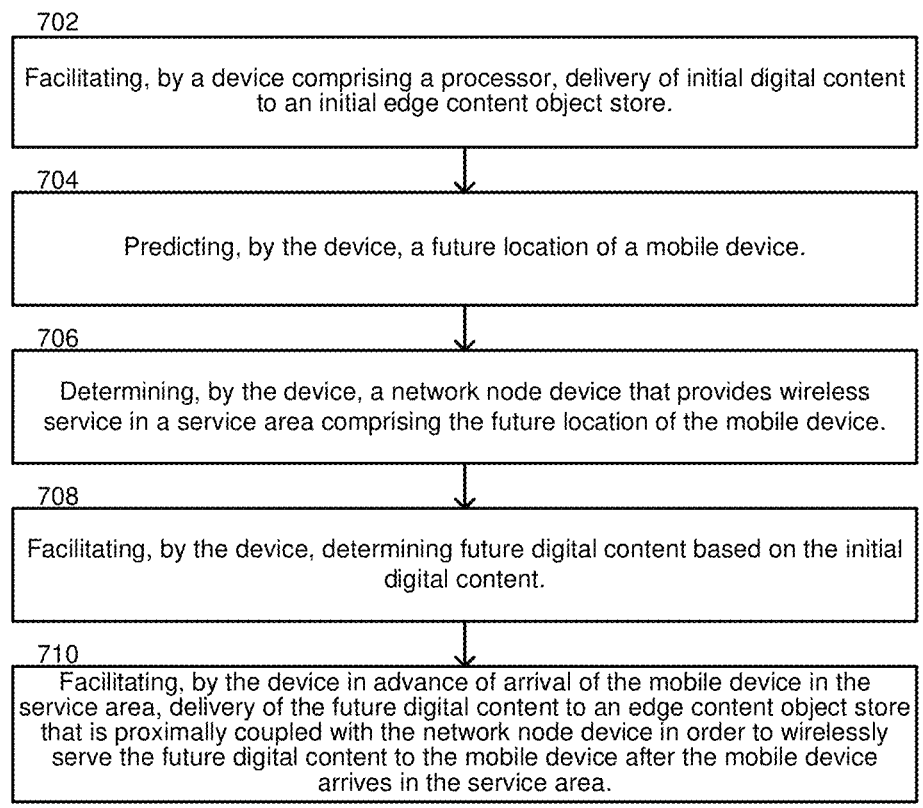
FIG. 7 is a flow diagram representing example operations of a communication service provider network device comprising a predictive content mobilization module, in accordance with various aspects and embodiments of the subject disclosure.

FIG. 7 is a flow diagram representing example operations of a communication service provider network device comprising a predictive content mobilization module, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by a server 300 equipped with a predictive content mobilization module 310, as illustrated in FIG. 3. The server 300 can be included in communication service provider network(s) 106 such as illustrated in FIG. 2. The operations of FIG. 7 are therefore described with reference to FIG. 2 and FIG. 3. Example operations comprise operation 702, which represents facilitating, by a device 300 comprising a processor, delivery of initial digital content to an initial edge content object store. For example, as illustrated in FIG. 2, initial digital content can be delivered to the initial edge content object store 201B which is proximally coupled with an initial network node device 201A that provides wireless service in an initial service area (a service area of network node 201) in order to wirelessly serve the initial digital content to the mobile device 250 while the mobile device 250 is in the initial service area. Facilitating delivery of initial digital content can comprise facilitating delivery by CDN 220 or facilitating delivery by communication service provider network(s) 106, or combinations thereof.

At operation 704, the device 300 can predict a future location 254A or 254B of a mobile device 250. For example, a future UE location/network node predictor 312 can predict a future UE 250 location 254A or 254B, e.g., as described in connection with FIG. 3. Predicting the future location 254A or 254B of the mobile device 250 can comprise using a location and a direction of travel of the mobile device 250 to predict the future location 254A or 254B, using a navigation route for the mobile device 250 to predict the future location 254A or 254B, and/or determining a future location 254A or 254B probability for the mobile device 250 based on historical mobile device location data.

At operation 706, the device 300 can determine a network node device, e.g., a network node device at network node 202 or at network node 204, which provides wireless service in a service area 212 or 214 comprising the future location 254A or 254B of the mobile device 250.

At operation 708, the device 300 can facilitate determining future digital content 260 based on the initial digital content delivered pursuant to operation 702. For example, the device 300 can include, in prediction information 266, DC state information 356 and/or calculated arrival time(s) of UE 250 at future locations 254A or 254B. The future digital content 260 can comprise, e.g., AR content, VR content, video content, or any other digital content. In the case of video content, future digital content 260 can comprise, e.g., a future segment of a video for display at the mobile device 250, wherein the future segment of the video can be determined based on a current segment of the video displayed at the mobile device 250 as well as on estimated arrival time(s) of the mobile device 250 at future location(s) 254A or 254B.

At operation 710, the device 300 can facilitate delivery, in advance of arrival of the mobile device 250 in the service area 212 or 214, delivery of future digital content 260 to an edge content object store 202B or 204B that is proximally coupled with the network node device (of network node 202 or 204) in order to wirelessly serve the future digital content 260 to the mobile device 250 after the mobile device 250 arrives in the service area 212 or 214. Facilitating delivery of future digital content 260 can comprise, e.g., facilitating delivery by CDN 220 or facilitating delivery by communication service provider network(s) 106, or combinations thereof. For example, facilitating the delivery of the future digital content 260 to the edge content object store 202B can comprise sending an instruction, such as prediction information 266, to a content delivery network device such as CDN 420.

In some embodiments, predicting the future location of the mobile device 250 at operation 704 can comprise predicting multiple potential future locations 254A and 254B of the mobile device 250. Operation 706 can comprise determining multiple potential network node devices (of network nodes 202 and 204) that provide wireless service in multiple potential service areas 212, 214 comprising the multiple potential future locations 254A and 254B of the mobile device 250. Operation 710 can comprise facilitating the delivery of the future digital content 260 to multiple potential edge content object stores 202B, 204B proximally coupled with the multiple potential network node devices (of network nodes 202 and 204).

In some embodiments, the future location 254A or 245B of the mobile device 250 can comprises a future location of multiple mobile devices. The future digital content 260 can comprise digital content predicted to be requested by the multiple mobile devices at the future location 254A or 245B of the multiple mobile devices.

Figure 8:
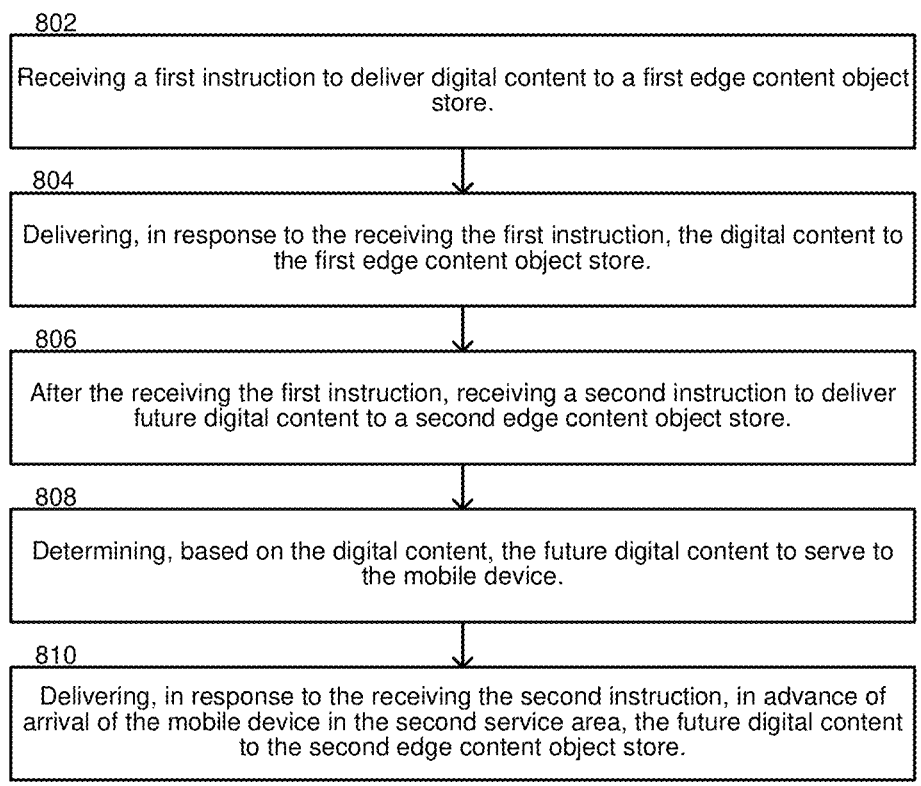
FIG. 8 is a flow diagram representing example operations of a CDN server, in accordance with various aspects and embodiments of the subject disclosure.

FIG. 8 is a flow diagram representing example operations of a CDN server, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a CDN server 420 as illustrated in FIG. 4. The CDN server 420 can be included in CDN 220 such as illustrated in FIG. 2. The operations of FIG. 8 are therefore described with reference to FIG. 2 and FIG. 4. Example operations comprise operation 802, which represents receiving a first instruction to deliver digital content to a first edge content object store. For example, prior to receiving prediction information 266, CDN server 420 can receive a first instruction from communication service provider network(s) 106 to deliver initial digital content to first edge content object store 201B. The first edge content object store 201B can be proximally coupled with a first network equipment, namely, first network node device 201A that provides wireless service in a first service area (the service area of network node 201, not shown in FIG. 2). The wireless service provided by network node 201 is able to wirelessly serve the initial digital content to a mobile device 250 while the mobile device 250 is in the first service area (the service area of network node 201, not shown in FIG. 2). At operation 804, the CDN server 420 can deliver, in response to the receiving the first instruction at operation 802, the initial digital content to the first edge content object store 201B.

At operation 806, after receiving the first instruction at operation 802, the CDN server 420 can receive a second instruction, in the form of prediction information 266, to deliver future digital content 260 to a second edge content object store, e.g., second edge content object store 202B.

The second edge content object store 202B can be proximally coupled with a second network equipment, namely second network node device 202A to wirelessly serve the future digital content 260 to the mobile device 250 in a second service area 212 while the mobile device 250 is in the second service area 212.

At operation 808, the CDN server 420 can determine, based on the digital content delivered pursuant to operations 802 and 804, the future digital content 260 to serve to the mobile device 250 at operation 810. The second instruction/prediction information 266 at operation 806 need not specify exactly the content to include in the future digital content 260. Instead, the prediction information 266 can comprise DC state information 356 and estimated arrival time, as described herein, and the CDN server 420 can determine the future digital content 260. The digital content and the future digital content 260 can comprise, e.g., AR or VR content based on applicable service areas, e.g., based on the second service area 212, or different portions of a video, or any other digital content.

At operation 810, the CDN server 420 can deliver, in response to the receiving the second instruction/prediction information 266, and in advance of arrival of the mobile device 250 in the second service area 212, the future digital content 260 to the second edge content object store 202B. In some embodiments, the second instruction/prediction information 266 to deliver the future digital content 260 to the second edge content object store 202B can comprise instructions to deliver the future digital content 260 to multiple potential second edge content object stores 202B, 204B proximally coupled with multiple potential second network node devices 202A, 204A, and operation 810 can comprise delivering the future digital content 260 to the multiple potential second edge content object stores 202A, 204A.

Figure 9:
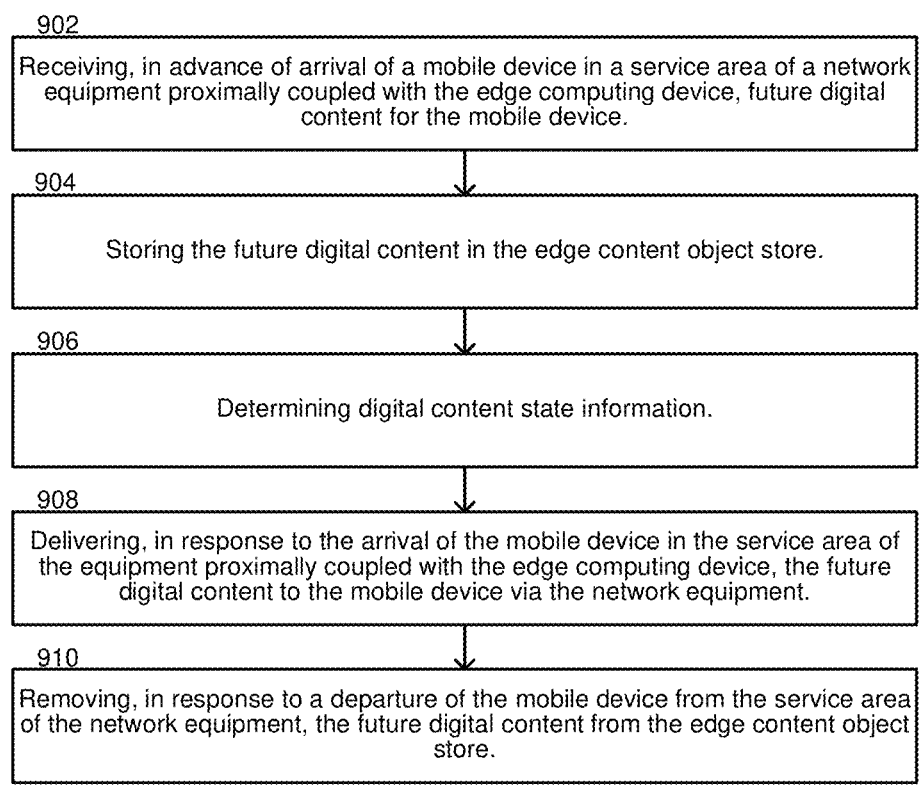
FIG. 9 is a flow diagram representing example operations of an edge computing device, in accordance with various aspects and embodiments of the subject disclosure.

FIG. 9 is a flow diagram representing example operations of an edge computing device, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by an edge computing device such as DC server 510 illustrated in FIG. 5. The DC server 510 can be included in, or proximally coupled to, network node device(s) 504A, which can in turn be included in a network node such as network node 504 or network node 202, illustrated in FIG. 2. The operations of FIG. 9 are therefore described with reference to FIG. 2 and FIG. 5. Example operations comprise operation 902, which represents receiving, in advance of arrival of a mobile device 250 in a service area 212 of a network equipment comprising network node device 202A proximally coupled with the edge computing device (e.g., the edge computing device comprising edge content object store 202B), future digital content 260 for the mobile device 250. At operation 904, the edge computing device associated with edge content object store 202B can store the future digital content 260 in the edge content object store 202B.

At operation 906, the edge computing device associated with edge content object store 202B can determine digital content state information. For example, upon entry of UE 250 in the service area 212 associated with edge content object store 202B, the devices of network node 202 can determine digital content state information at UE 250, in order to select content from digital content 260 for delivery to the UE 250. Delivering the future digital content 260 to the mobile device at operation 908 can thereby be performed according to the digital content state information gathered at operation 906.

Operation 908 represents delivering, in response to the arrival of the mobile device 250 in the service area 212 of the network equipment comprising network node device 202A proximally coupled with the edge computing device (associated with edge content object store 202B), the future digital content 260 to the mobile device 250 via the network node device 202A. For example, with reference to FIG. 5, network communications 262 can be used to deliver the future digital content 260 to the mobile device 250.

Operation 910 represents removing, in response to a departure of the mobile device 250 from the service area 212 of the network equipment comprising network node device 202A, the future digital content 260 from the edge content object store 202B. In some embodiments, the future digital content 260 is no longer needed in the edge content object store 202B after the mobile device 250 departs from the service area 212. In other embodiments, operation 910 can be eliminated, e.g., where other mobile devices are likely to make further use of future digital content 260.

Figure 10:
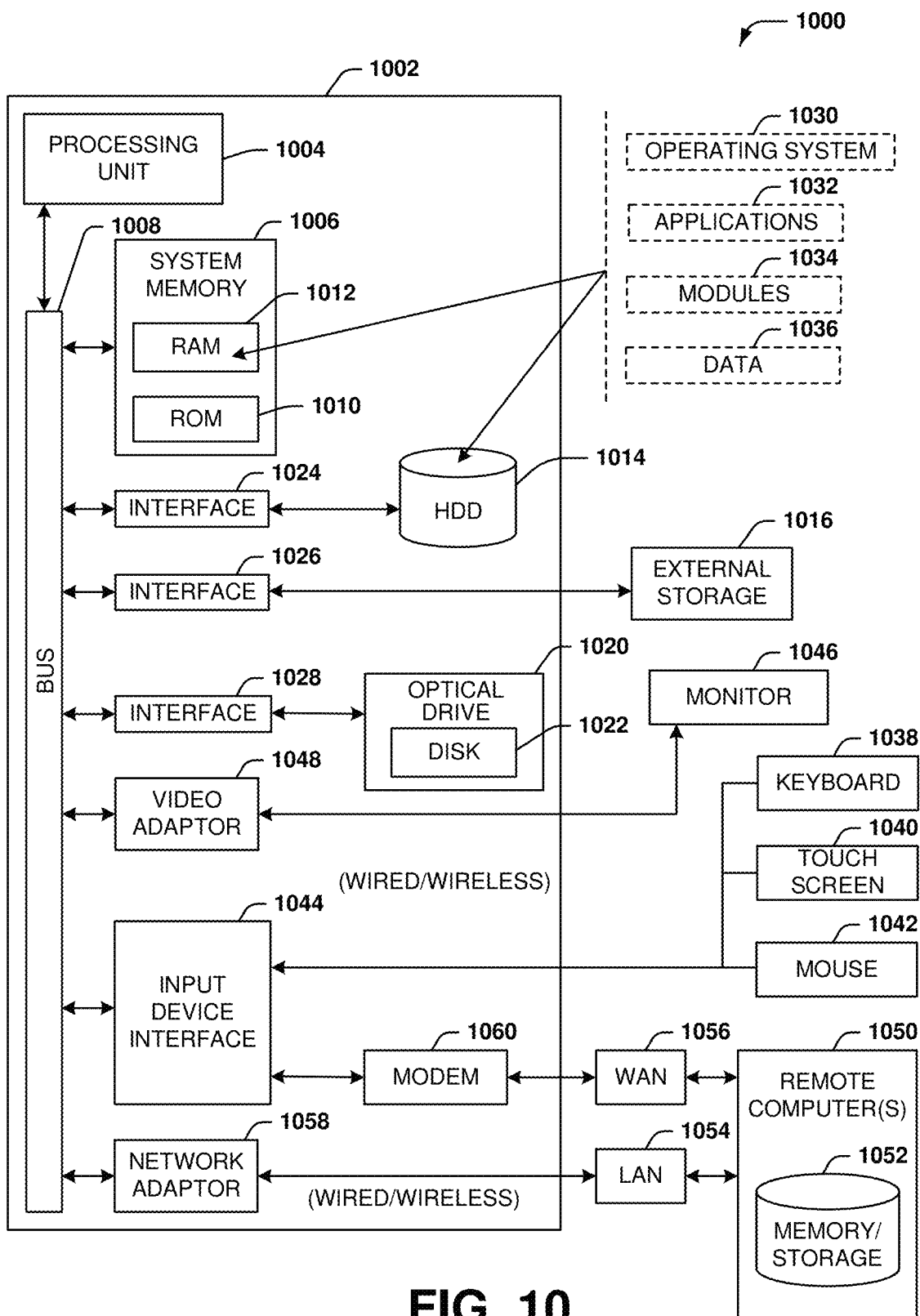
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, a server 300, a CDN server 420, a DC server 510, network node device 504A, or other computing devices described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and nonremovable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
predicting, by a cellular service provider network device comprising a processor, a future location of a mobile device;
determining, by the cellular service provider network device, a network node device of a radio access network that provides wireless service on behalf of the cellular service provider in a service area comprising the future location of the mobile device; and
facilitating, by the cellular service provider network device in advance of arrival of the mobile device in the service area, delivery of future digital content to an edge content object store that is proximally coupled within a defined proximal distance of the network node device in order to wirelessly serve the future digital content to the mobile device after the mobile device arrives in the service area,
wherein the future digital content comprises augmented reality content based on the service area and based on object types associated with a session at the mobile device,
wherein facilitating the delivery of the future digital content to the edge content object store comprises sending, by the cellular service provider network device, prediction information to a content delivery network device that is separate from the cellular service provider network device and the network node device, and
wherein the prediction information enables delivery, by the content delivery network device, of the future digital content to the edge content object store, based on receipt of the prediction information from the cellular service provider network device.

2. The method of claim 1, further comprising, prior to the delivery of the future digital content, facilitating, by the cellular service provider network device, delivery of initial digital content to an initial edge content object store, wherein the initial edge content object store is proximally coupled with an initial network node device that provides wireless service in an initial service area in order to wirelessly serve the initial digital content to the mobile device while the mobile device is in the initial service area.

3. The method of claim 2, further comprising facilitating, by the cellular service provider network device, determining the future digital content based on the initial digital content by sending, by the cellular service provider network device, digital content state information to the content delivery network device.

4. The method of claim 1, wherein the augmented reality content comprises electric utility component information.

5. The method of claim 1, wherein the future digital content further comprises a future segment of a video for display at the mobile device, and wherein the future segment of the video is determined based on a current segment of the video displayed at the mobile device.

6. The method of claim 1, wherein predicting the future location of the mobile device comprises using a location and a direction of travel of the mobile device to predict the future location.

7. The method of claim 1, wherein predicting the future location of the mobile device comprises using a navigation route for the mobile device to predict the future location.

8. The method of claim 1, wherein predicting the future location of the mobile device comprises determining a future location probability for the mobile device based on historical mobile device location data.

9. The method of claim 1, wherein the prediction information comprises an identification of the network node device and an estimated time of arrival of the mobile device in the service area.

10. The method of claim 1, wherein:
predicting the future location of the mobile device comprises predicting multiple potential future locations of the mobile device;
determining the network node device that provides wireless service in the service area comprises determining multiple potential network node devices that provide wireless service in multiple potential service areas comprising the multiple potential future locations of the mobile device; and
facilitating the delivery of the future digital content to the edge content object store comprises facilitating the delivery of the future digital content to multiple potential edge content object stores proximally coupled with the multiple potential network node devices.

11. The method of claim 1, wherein:
the future location of the mobile device comprises a future location of multiple mobile devices; and
the future digital content comprises digital content predicted to be requested by the multiple mobile devices at the future location of the multiple mobile devices.

12. A content delivery network device, comprising:
a processor; and
a memory that stores executable instructions that, when executed by the processor, facilitate performance of operations, comprising:
receiving, by the content delivery network device, from a cellular service provider network device that is separate from the cellular service provider network device, a first instruction to deliver digital content to a first edge content object store, wherein the first edge content object store is proximally coupled within a defined proximal distance of a first network equipment of a radio access network that provides wireless service on behalf of the cellular service provider in a first service area, wherein the first network equipment is separate from the cellular service provider network device, and wherein the wireless service is able to wirelessly serve the digital content to a mobile device while the mobile device is in the first service area;

delivering, by the content delivery network device, in response to receiving the first instruction, the digital content to the first edge content object store;

after receiving the first instruction, receiving, from the cellular service provider network device, a second instruction comprising prediction information, wherein the prediction information enables identification of a second edge content object store, wherein the second edge content object store is proximally coupled within the defined proximal distance of a second network equipment of the radio access network, wherein the second network equipment is separate from the cellular service provider network device, and wherein the second edge content object store is configured to wirelessly serve future digital content to the mobile device in a second service area while the mobile device is in the second service area; and delivering, by the content delivery network device in response to receiving the second instruction from the cellular service provider network device, in advance of arrival of the mobile device in the second service area, the future digital content to the second edge content object store based on receipt of the prediction information from the cellular service provider network device, wherein the future digital content comprises augmented reality content based on the second service area and based on object types associated with a session at the mobile device.

13. The content delivery network device of claim 12, wherein the operations further comprise determining, based on the prediction information, the future digital content to deliver to the second edge content object store.

14. The content delivery network device of claim 12, wherein the augmented reality content comprises game information.

15. The content delivery network device of claim 12, wherein the digital content and the future digital content comprise different portions of a video.

16. The content delivery network device of claim 12, wherein the prediction information enables identification of multiple potential second edge content object stores proximally coupled within the defined proximal distance of multiple potential second network equipment, and wherein delivering the future digital content to the second edge content object store comprises delivering the future digital content to the multiple potential second edge content object stores.

17. A non-transitory machine-readable storage medium, comprising executable instructions that, when executed by a processor of an edge computing device comprising an edge content object store, facilitate performance of operations, comprising:

receiving, by the edge computing device from a content delivery network device, future digital content for a mobile device, wherein the future digital content is received in advance of arrival of the mobile device in a service area of a network equipment separate from the content delivery network device and proximally coupled to the edge computing device within a defined proximal distance of the edge computing device, wherein the future digital content comprises augmented reality content based on the service area and based on object types associated with a session at the mobile device, wherein the network equipment comprises equipment of a radio access network that provides wireless service on behalf of a cellular service provider, wherein a cellular service provider network device of the cellular service provider, the cellular service provider network device being separate from the content delivery network device, has predicted the arrival of the mobile device in the service area and provided prediction information to enable delivery of the future digital content to the edge computing device by the content delivery network device;

storing the future digital content in the edge content object store;

delivering, in response to the arrival of the mobile device in the service area of the network equipment proximally coupled within the defined proximal distance of the edge computing device, the future digital content to the mobile device via the network equipment; and removing, in response to a departure of the mobile device from the service area of the network equipment, the future digital content from the edge content object store.

18. The non-transitory machine-readable storage medium of claim 17, wherein the operations further comprise determining digital content state information by the edge computing device in response to the arrival of the mobile device in the service area, and wherein delivering the future digital content to the mobile device is performed according to the digital content state information.

19. The non-transitory machine-readable storage medium of claim 17, wherein the future digital content further comprises virtual reality content.

20. The non-transitory machine-readable storage medium of claim 17, wherein the network equipment communicates according to a fifth generation wireless communication protocol.

* * * * *